United States Patent
Kubota

Patent Number: 5,093,905
Date of Patent: Mar. 3, 1992

[54] INCLINED RECTANGULAR PATTERN GENERATING SYSTEM

[75] Inventor: Kazuhiro Kubota, Tokyo, Japan

[73] Assignee: NEC Corporation, Tokyo, Japan

[21] Appl. No.: 400,663

[22] Filed: Aug. 31, 1989

[30] Foreign Application Priority Data

Aug. 31, 1988 [JP] Japan .................. 63-217289
Sep. 30, 1988 [JP] Japan .................. 63-246377

[51] Int. Cl.$^5$ .............................. G06F 15/63
[52] U.S. Cl. ............................ 395/143; 395/141
[58] Field of Search ............. 364/518, 521; 340/721, 340/723

*Primary Examiner*—Heather R. Herndon
*Attorney, Agent, or Firm*—Foley & Lardner

[57] ABSTRACT

An inclined rectangular pattern generating system includes a lengthwise straight line generator coupled to receive inclined angle information for generating X- and Y- direction increment/decrement signals indicative of a coordinate change component between a dot being currently written into the memory and a dot into be next written to the memory, these dots being adjacent to each other and being included in a string of dots which form a lengthwise straight line in a parallel to a lengthwise side of the inclined rectangular pattern to be generated. There is also provided a widthwise straight line generator coupled to the inclined angle information for generating X- and Y- direction increment/decrement signals indicative of a coordinate change component between a starting dot of a lengthwise straight line being currently written into the memory and a starting dot of another lengthwise straight line to be next written to the memory. A dot controller is coupled into the lengthwise and widthwise straight line generators and operates in such a manner that when the lengthwise straight line generator indicates a coordinate change both in X- and Y- directions and when the widthwise straight line generator indicates a coordinate change both in X- and Y- directions, the dot controller causes the dot information writing circuit to write a dot information into a memory location of a display memory corresponding to a coordinate which changes only either in the X-direction or in the Y-direction from the coordinate into which the dot information has been written just before.

5 Claims, 4 Drawing Sheets

INCLINED RECTANGULAR PATTERN GENERATING SYSTEM

BACKGROUND OF THE INVENTION

1. Field of the Invention

The present invention relates to a digital data processor, and more specifically to an inclined rectangular pattern generating system for generating a rectangular pattern which is inclined to an X axis by an angle $\theta$ in a two-dimensional X-Y plane, by means of rewriting a memory space storing a graphic pattern.

2. Description of Related Art

In general, a graphic pattern such a rectangle has been displayed on a graphic display by performing required processing on a graphic or display memory which is composed of unitary memory elements each corresponding to a unitary dot displayed on a display screen in a one-to-one relation.

For example, in a case of indicating an elongated rectangle, a lengthwise straight line having a width corresponding to the unitary dot is drawn or depicted by a so-called lengthwise straight line generator in a vector direction of one lengthwise side of the elongated rectangle to be indicated. In addition, in order to cause the rectangle to have a given width, a required number of lengthwise straight lines having the unitary dot width are drawn or depicted. In this process, in order to determine a starting point of each of the required number of lengthwise straight lines, a so-called widthwise straight line generator is used for generating one normal line formed by the starting points of all the lengthwise straight lines to be drawn. Thus, coordinates of all dots required to form the elongated rectangle to be drawn or depicted are obtained by use of the lengthwise straight line generator and the widthwise straight line generator in combination, with the result that the elongated rectangle having a given length and a given width are drawn.

More specifically, one example of drawing a rectangle will be explained with reference to FIGS. 1 to 3. In these figures, small circles indicate a unitary dot indicated on a display screen. Ordinarily, when a straight line pattern formed by a straight line generator is inclined to an X-axis by an angle less than 45 degree, the straight line pattern will continuously change its X coordinate dot by dot, but with each one dot change of the X coordinate, the Y-coordinate of the straight line pattern will change one dot or will not change, as shown in FIG. 1. On the other hand, when a straight line pattern formed by the straight line generator is inclined to the X-axis by an angle greater than 45 degree, the straight line pattern will continuously change its Y coordinate dot by dot, but the X-coordinate of the straight line pattern will change one dot or will not change in response to each one dot change of the Y coordinate, as shown in FIG. 2.

Now, assume that a rectangle having a length of 6 dots and a width of 5 dots and having an inclination angle of $\theta$ to the X axis is drawn by using two straight line generators having the above mentioned characteristics.

As shown in FIG. 3, a first lengthwise straight line starting from a coordinate of (XD, YD) (i. e., one corner of the rectangle to be drawn) and formed of a string of dots A1, B1, C1, D1, E1 and F1 is drawn by a lengthwise straight line generator. Thereafter, a second lengthwise straight line formed of a string of dots A2, B2, C2, D2, E2 and F2 as shown in FIG. 3 is to be drawn by the lengthwise straight line generator. At this time, in order to determine a starting dot A2 of the second lengthwise straight line, a widthwise straight line generator as mentioned hereinbefore is used to generate a widthwise line which forms one widthwise side of the rectangle to be drawn extending from the above mentioned corner of the rectangle and which will be formed by respective starting dots A2, A3, A4, and A5 of the second and succeeding lengthwise straight lines. Then, the second and succeeding lengthwise straight lines respectively starting from the dots A2, A3, A4, and A5 thus obtained are sequentially formed by the lengthwise straight line generator.

Thus, as shown in FIG. 3, there has been drawn the elongated rectangle having a length of 6 dots and a width of 5 dots and having X- and Y-direction minute changes $\Delta X$ and $\Delta Y$ corresponding to the inclination angle $\theta$ of the lengthwise side to the X axis ($\Delta X/\Delta Y = -\tan\theta$).

However, in the case that an inclined rectangle is drawn, undrawn dots will occur as black dots shown in FIG. 3. This means that memory cells of the display memory corresponding to the undrawn dots, i. e., the black dots will maintain such information as existed before the rectangle concerned has been drawn. The rectangle having the undrawn dots, which can be called a "dot missing" or "wormhole rectangle", cannot give a natural impression to a viewer.

SUMMARY OF THE INVENTION

Accordingly, it is an object of the present invention to provide an inclined rectangular pattern generating system which has overcome the above mentioned defect of the conventional one.

Another object of the present invention is to provide an inclined rectangular pattern generating system capable of drawing an inclined rectangular pattern without the "dot missing" or "wormhole" effect.

The above and other objects of the present invention are achieved in accordance with the present invention by a rectangular pattern generating system for generating an inclined rectangular pattern on a two-dimensional X-Y plane by re-writing a display memory, comprising:

a read-write memory composed of a number of unitary memory elements corresponding to coordinate points on the two-dimensional X-Y plane in a one-to-one relation;

means storing inclined angle information of the inclined rectangular pattern to be generated;

lengthwise straight line generating means coupled to the inclined angle information storing means for generating X- and Y- direction increment/decrement signals indicative of a coordinate change component between a dot being currently written into the memory and a dot to be next written into the memory, these two dots being adjacent to each other and being included in a string of dots which form a lengthwise straight line in parallel to a lengthwise side of the inclined rectangular pattern to be generated;

widthwise straight line generating means coupled to the inclined angle information storing means for generating X- and Y- direction increment/decrement signals indicative of a coordinate change component between a starting dot of a lengthwise straight line being currently written into the memory and a starting dot of another lengthwise straight line to be next written into the memory;

means coupled to the lengthwise straight line generating means and the widthwise straight line generating means for generating an address and coupled to the memory for supplying the generated address to the memory;

means coupled to the memory for writing dot information into a unitary memory element of the memory designated by the address generating means; and a dot controller coupled to the lengthwise straight line generating means and the widthwise straight line generating means and operating in such a manner that when the lengthwise straight line generating means indicates a coordinate change both in X- and Y- directions and when the widthwise straight line generating means indicates a coordinate change both in X- and Y-direction, the dot controller causes the dot information writing means to write dot information into a unitary memory element of the memory corresponding to a coordinate which changes only either in the X-direction or in the Y-direction from the coordinate into which the dot information has been written just before.

The above and other objects, features and advantages of the present invention will be apparent from the following description of preferred embodiments of the invention with reference to the accompanying drawings.

DESCRIPTION OF THE PREFERRED EMBODIMENTS

Figure 4:
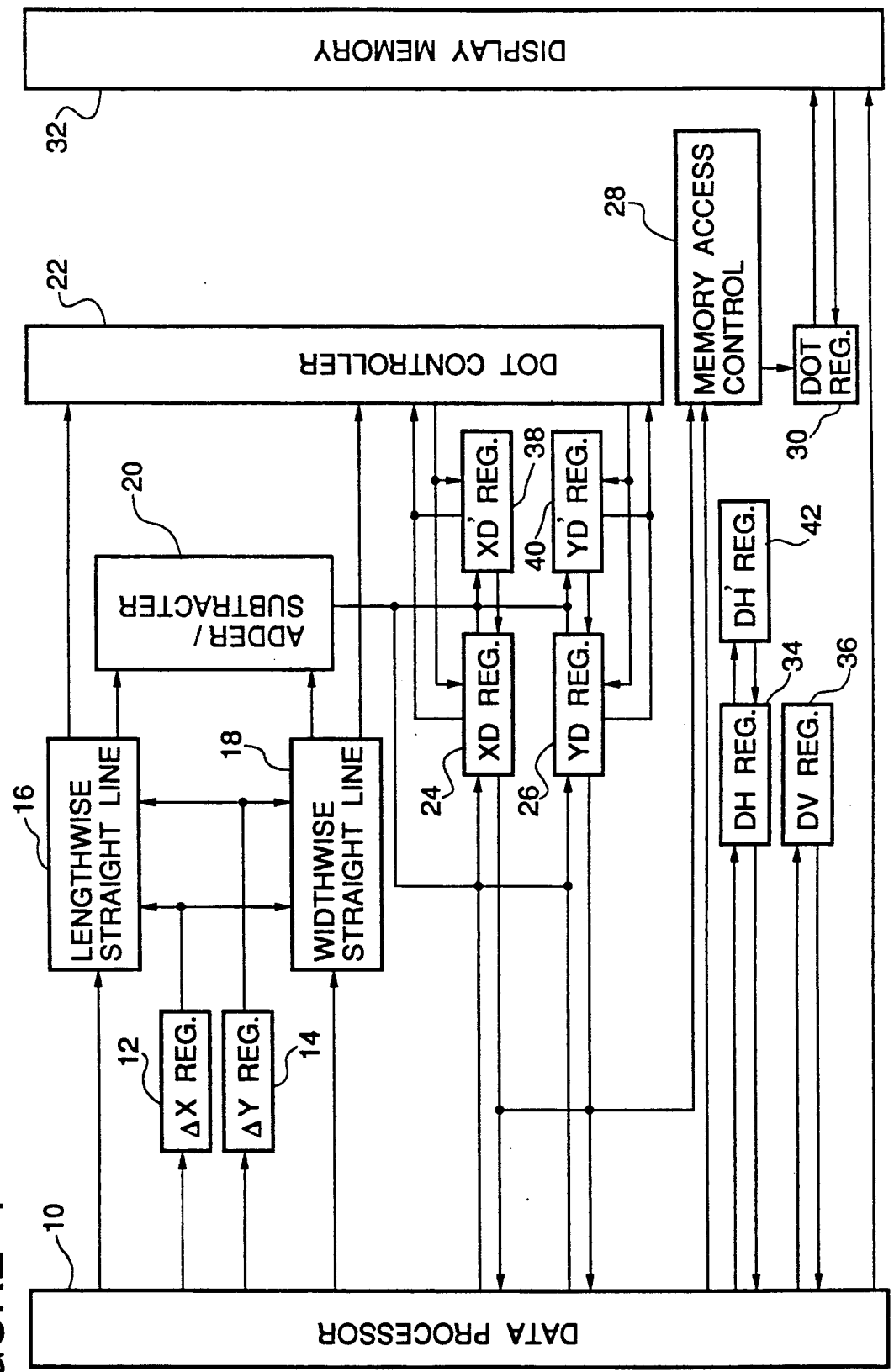
FIG. 4 is a block diagram of an embodiment of the inclined rectangular pattern generating system in accordance with the present invention.

Referring of FIG. 4, there is shown a diagram of an embodiment of the inclined rectangular pattern generating system in accordance with the present invention. The inclined rectangular pattern generating system shown comprises a data processor 10 for supplying necessary data to registers, straight line generators and other circuits explained hereinafter and for controlling these registers, straight line generators and other circuits. Namely, the data processor 10 supplies a $\Delta X$ register 12 and $\Delta Y$ register 14 with X- and Y- direction minutes changes $\Delta X$ and $\Delta Y$, respectively, where $\Delta X / \Delta Y = \tan \theta$ and $\theta$ is an inclined angle between an X axis and the lengthwise side of the rectangle to be drawn. The $\Delta X$ register 12 and $\Delta Y$ register 14 are connected to a lengthwise straight line generator 16 controlled by the data processor 10 so as to generate coordinates for a lengthwise straight line having a width corresponding to a unitary dot, in parallel to a length side of a rectangle to be drawn or depicted. The $\Delta X$ register 12 and the $\Delta Y$ register 14 are also connected to a widthwise straight line generator 18 controlled by the data processor 10 so as to generate coordinates for a widthwise straight line formed of starting dots of a plurality of lengthwise straight lines having the unitary dot width when the plurality of lengthwise straight lines are to be drawn. Specifically, each of the lengthwise straight line generator 16 and the widthwise straight line generator 18 operates to generate X- and Y-direction increment/decrement signals supplied to an adder/subtracter 20, which operates to increment or decrement registers explained hereinafter. The lengthwise straight line generator 16 and the widthwise straight line generator 18 are also coupled to a dot controller 22, which operates as follows. When a coordinate ($XL_i$, $YL_i$) generated by the lengthwise straight line generator 16 changes both in a X-coordinate and in a Y-cooordinate from an immediately preceding coordinate ($XL_{i-1}$, $YL_{i-1}$) generated by the lengthwise straight line generator 16, and when a coordinate ($XW_i$, $YW_i$) generated by the widthwise straight line generator 18 changes both in a X-coordinate and in a Y-coordinate from an immediately preceding coordinate ($XW_{i-1}$, $YW_{i-1}$) generated by the widthwise straight line generator 18, the dot controller 22 operates to the effect that a dot is written at a coordinate ($XL_i$, $YL_{i-1}$) or ($XL_{i-1}$, $YL_i$) which changes only in the X-direction or in the Y-direction from the immediately preceding coordinate ($XL_{i-1}$, $YL_{i-1}$) generated by the lengthwise straight line generator 16.

In addition, the system shown includes a XD register 24 and a YD register 26 which store an X-coordinate and a Y-coordinate, respectively, of a dot to be written. The XD register 24 and the YD register 26 are coupled to the data processor 10 so as to receive a X-coordinate and a Y-coordinate of a drawing starting point from the data processor 10 an to output a X-coordinate and a Y-coordinate of a dot to be written, to the data processor 10. In addition, the XD register 24 and the YD register 26 are coupled to a memory access controller 28, which can be called a "drawer" and is coupled to receive signals from the data processor 10. This memory access controller 28 is also coupled to a dot information register 30 for holding dot information read from and to be written into a display memory 32. On the basis of the signals outputted from the data processor 10 and the registers 24 and 26, the memory access controller 28 operates to cause the content of the dot information register 30 (namely, a dot) to be written into a memory location (i.e., a unitary memory element) of the display memory 32 corresponding to the X-coordinate and the Y-coordinate stored in the XD register 24 and the YD register 26.

Furthermore, the system includes a DH register 34 coupled to the data processor 10 for storing a length DH of a rectangle to be drawn, and a DV register 36 coupled to the data processor 10 for storing a width DV of the rectangle to be drawn. The XD register 24, the YD register 26 and the DH register 34 are associated with preserving work registers 38, 40 and 42, respectively.

Figure 5:
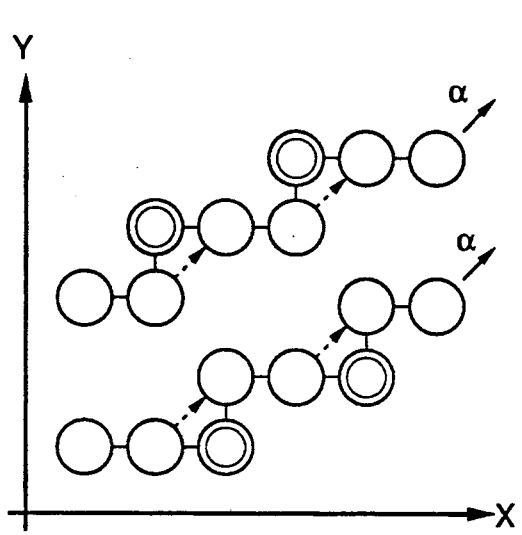
FIG. 5 is a diagram illustrating a straight line pattern having an inclined angle less than 45 degrees to a horizontal axis, which is drawn in accordance with the present invention by using a straight line generator and a dot controller in accordance with the present invention in combination.
Figure 6:
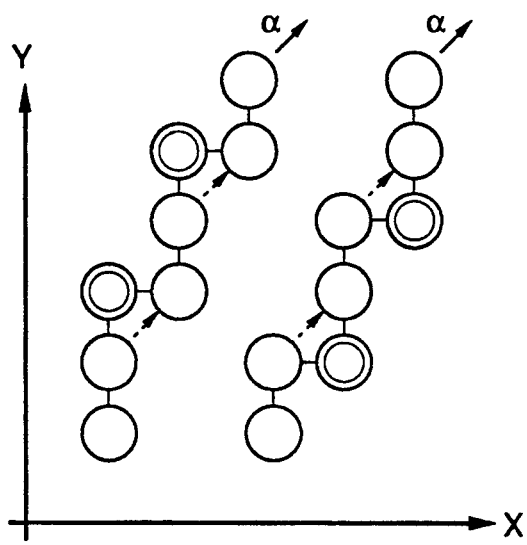
FIG. 6 is a diagram illustrating a straight line pattern having an inclined angle greater than 45 degrees to a horizontal axis, which is drawn in accordance with the present invention by using a straight line generator and a dot controller in accordance with the present invention in combination.
Figure 7:
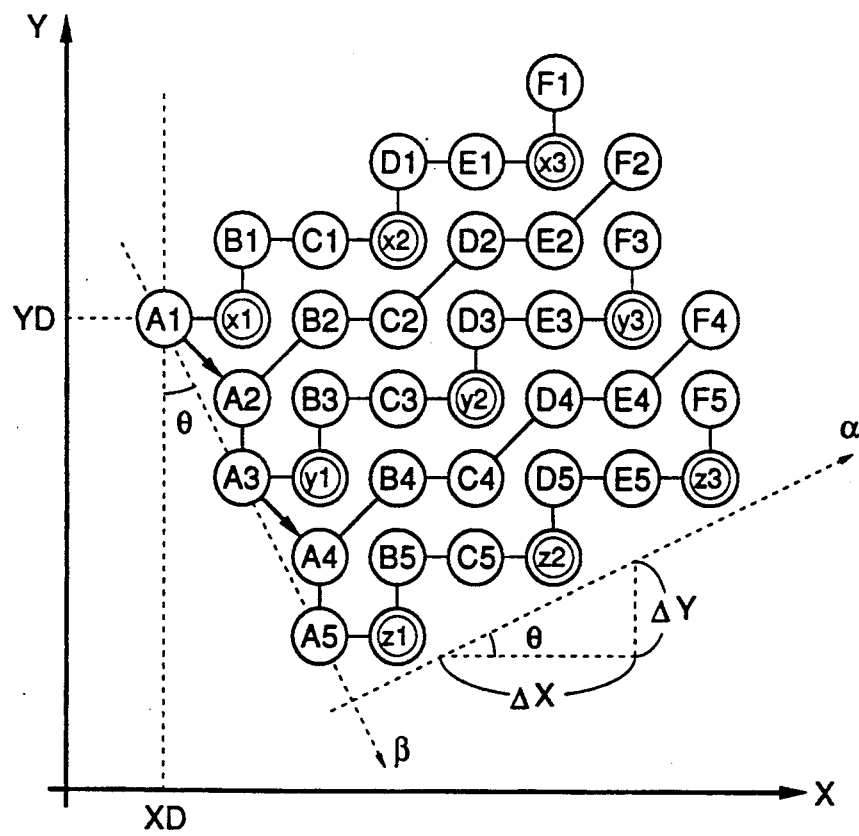
FIG. 7 is a diagram of a rectangular pattern having a length of 6 dots and a width of 5 dots and having an inclined angle $\theta$ to a horizontal axis, which is drawn in accordance with the present invention by using the straight line patterns shown in FIGS. 5 and 6.

FIGS. 5 to 7 show examples of patterns drawns illustrating a specific drawing operation of the above mentioned inclined rectangular pattern generating system. In these figures, each circle shows one dot indicated on a display screen.

Specifically, FIG. 5 illustrates a straight line pattern having an inclined angle less than 45 degrees to a horizontal axis, which is drawn by cooperation of the lengthwise straight line generator 16 and the dot controller 22, and FIG. 6 illustrates a straight line pattern having an inclined angle greater than 45 degrees to a horizontal axis, which is also drawn by cooperation of the lengthwise straight line generator 16 and the dot controller 22.

FIG. 7 illustrates a rectangular pattern having a length of 6 dots and a width of 5 dots and having an inclined angle $\theta$ to a horizontal axis, which is drawn by using the straight line patterns shown in FIGS. 5 and 6. In FIG. 7, a coordinate (XD, YD) is indicative of a position of a dot A1 which corresponds to an upper left corner of the rectangular pattern to be drawn. Namely, the coordinate (XD, YD) means a drawing operation starting position or dot. $\theta$ represents an angle between an X axis and a direction of a lengthwise side of the rectangle to be drawn extending from the drawing operation starting dot A1. This direction will be called a "lengthwise vector" sometimes hereinafter, which is symbolized by $\alpha$ in the fugure. A direction of a widthwise side of the rectangular to be drawn extending from the drawing operation starting dot A1, will be called a "widthwise vector" sometimes hereinafter, which is symbolized by $\beta$ in the fugure. In addition, $\Delta X$ and $\Delta Y$ represent X- and Y- direction minute change components, respectively, which are defined by the angle $\theta (\Delta X/\Delta Y = \tan \theta)$.

Next, a basic operation of the inclined rectangular pattern generating system will be described with reference to the above explained figures. First, assume that the angle $\theta$ is greater than 0 degree but less than 45 degrees. In this case, a lengthwise straight line drawing pattern (namely, for preventing the so-called "wormhole") is determined based upon whether the "wormhole" occurs to the right or to the left of a lengthwise vector defined by a lengthwise line generated by using the lengthwise straight line generator 16. Two lengthwise straight line drawing patterns shown in FIG. 5 illustrate the two different cases, respectively. The lengthwise straight line drawing pattern shown in the upper portion of FIG. 5 shows the case in which the "wormhole" occurs to the left of the lengthwise vector as shown by double circles, and the lengthwise straight line drawing pattern shown in the lower portion of FIG. 5 shows the case in which the "wormhole" occurs to the right of the lengthwise vector as shown by double circles.

Whether the "wormhole" occurs to the right or to the left of a lengthwise vector defined by a lengthwise line generated by using the lengthwise straight line generator 16, namely, which of the two lengthwise straight line drawing patterns shown in FIG. 5 should be used, is determined by a widthwise vector defined by a line generated by the widthwise straight line generator 18. If the widthwise vector is directed towards the left of the lengthwise vector, the "wormhole" will occur at the left of the lengthwise vector, and therefore, the lengthwise straight line drawing pattern shown in the upper portion of FIG. 5 composed of dots indicated by the single circles and dots indicated by the double circles is then adopted. On the other hand, if the widthwise vector is directed towards the right of the lengthwise vector, the "wormhole" will occur to the right of the lengthwise vector, and therefore, the lengthwise straight line drawing pattern shown in the lower portion of FIG. 5 is then adopted.

Figure 1:
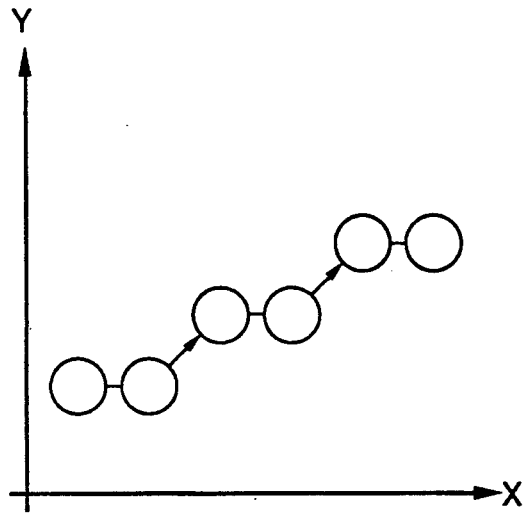
FIG. 1 is a diagram illustrating a straight line pattern drawn in a conventional manner, with an inclined angle less than 45 degrees to a horizontal axis.
Figure 2:
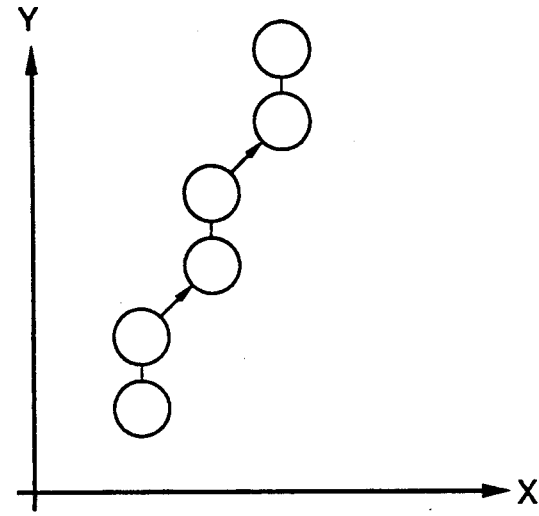
FIG. 2 is a diagram illustrating a straight line pattern drawn in a conventional manner, with an inclined angle greater than 45 degrees to a horizontal axis.
Figure 3:
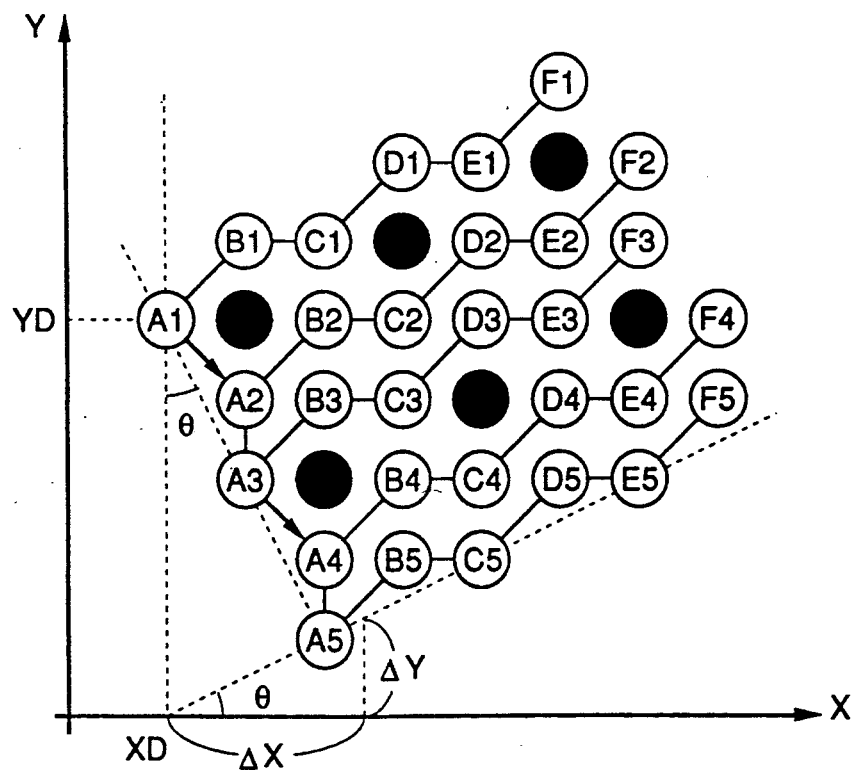
FIG. 3 is a diagram of a rectangular pattern having a length of 6 dots and a width of 5 dots and having an an inclined angle $\theta$ to a horizontal axis, which is drawn by using the straight line patterns shown in FIGS. 1 and 2.

In addition, it is seen from FIG. 3 that the "wormhole" will occur when the dot position of a lengthwise straight line drawing pattern starting from a starting dot whose dot position has changed both in the X-coordinate and in the Y-coordinate from a starting dot of an immediately preceding lengthwise straight line, changes both in the X-coordinate and in the Y-coordinate.

In the inclined rectangular pattern generating system, therefore, when occurrence of the "wormhole" is expected, the position of the expected "wormhole" is determined on the basis of the direction of the lengthwise vector and the direction of the widthwise vector, as shown by the dots indicated by the double circles in FIG. 5. In other words, the expected "wormhole" can be filled up by drawing the lengthwise straight line as the lengthwise straight line pattern shown in FIG. 5.

Next, assume that the angle $\theta$ is equal to or greater than 45 degrees but less than 90 degrees. This case is illustrated in FIG. 6. It will be apparent to persons skilled in the art from a comparison between FIGS. 5 and 6 that the "wormhole" in the second case can be prevented similarly to the first case. Furthermore, even if the angle $\theta$ is greater than 90 degrees, the "wormhole" can be prevented in a similar manner except that the directions of the lengthwise vector and/or the widthwise vector are different from the first case of the angle $\theta$ less than 45 degrees.

Figure 8:
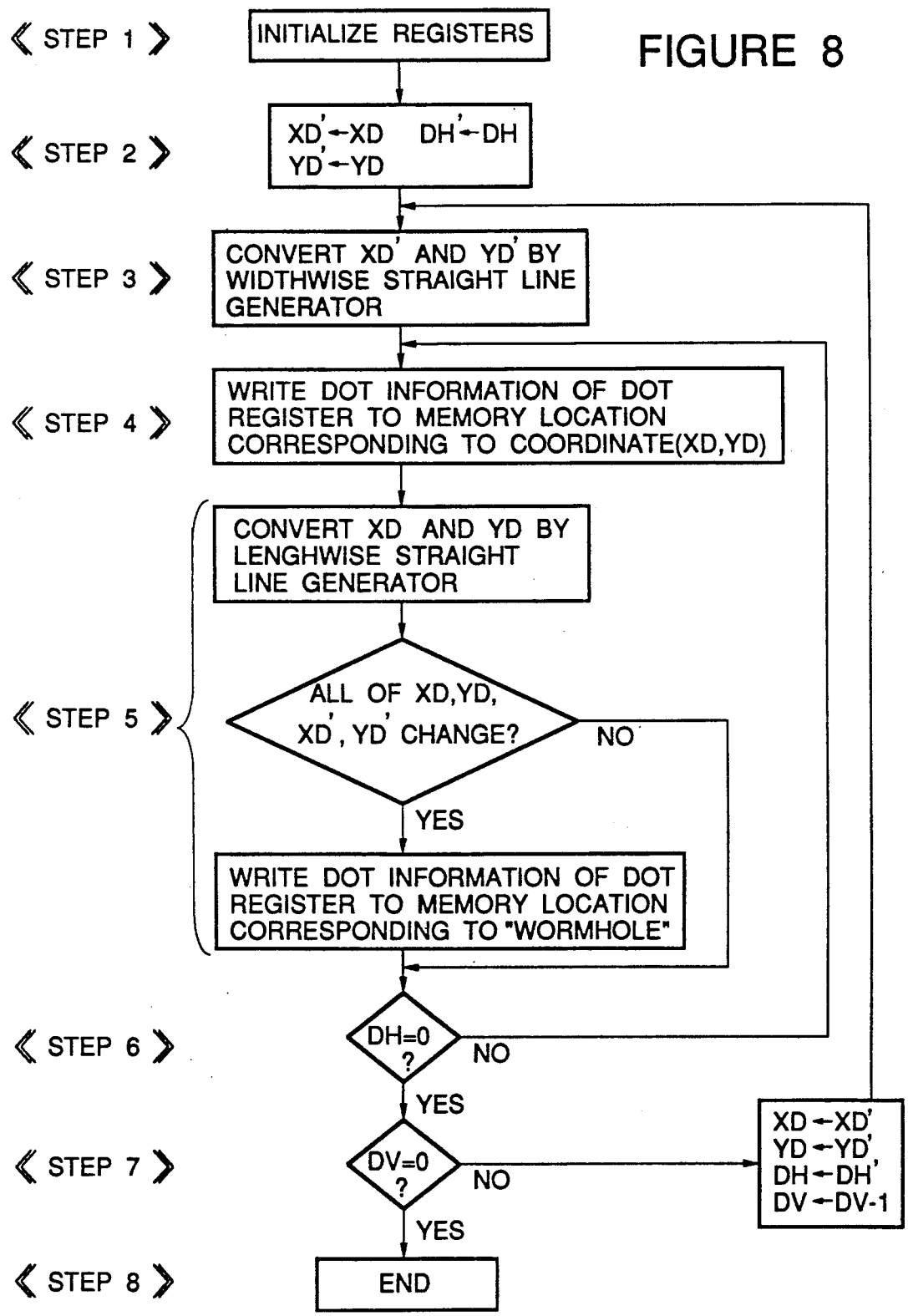
FIG. 8 is a flowchart illustrating a drawing operation of the inclined rectangular pattern generating system in accordance with the present invention.

Now, an operation for drawing an inclined rectangular pattern as shown in FIG. 7 will be described with reference to FIG. 8 showing a flow chart illustrating the operation of the inclined rectangular pattern generating system. Here, assume that the inclined rectangle to be drawn has the length DH and the width DV and also has an inclined angle $\theta$ between the X axis and the lengthwise side of the rectangle. Further, assume that a drawing starting point of the inclined rectangle is (XD, YD) on the X-Y coordinate plane.

STEP 1

First, X- and Y- direction minute changing components $\Delta X$ and $\Delta Y$ which are derived from the inclined angle $\theta$ are set into the $\Delta X$ register 12 and the $\Delta Y$ register 14 by the data processor 10, and the lengthwise straight line generator 16 and the widthwise straight line generator 18 are initialized by the data processor 10. Specifically, the lengthwise straight line generator 16 is initialized to continuously calculate an X-direction displacement and a Y-direction displacement of a lengthwise straight line on the basis of the minute changing components $\Delta X$ and $\Delta Y$ stored in the $\Delta X$ register 12 and the $\Delta Y$ register 14, and to generate an X-coordinate and a Y-coordinate of each of the dots forming the lengthwise straight line. On the other hand, the widthwise straight line generator 18 is initialized to continuously calculate an X-direction displacement and a Y-direction displacement of a widthwise straight line on the basis of the minute changing components $\Delta X$ and $\Delta Y$ stored in the $\Delta X$ register 12 and the $\Delta Y$ register 14, and to generate an X-coordinate and a Y-coordinate of each of the dots forming the widthwise straight line.

In addition, the XD register 24, the YD register 26, the DH register 34 and the DV register 36 are also initialized by the data processor 10 so as to hold an X-coordinate and a Y-coordinate of the drawing starting point (XD, YD), and the length and the width of the rectangle to be drawn, respectively.

STEP 2

The contents of the XD register 24, the YD register 26 and the DH register 34 are saved in the preserving working registers XD'38, YD'40 and DH'42, respectively.

STEP 3

The widthwise straight line generator 18 is controlled to generate, on the basis of the contents of the $\Delta X$ and $\Delta Y$ registers 12 and 14, an X-coordinate increment/decrement signal and a Y-coordinate increment/decrement signal which respectively indicate the displacement both in the X-direction and in the Y-direction from the drawing starting dot A1 (XD, YD) of a second dot A2 of a widthwise straight line extending from the drawing starting dot A1. On the basis of the X-coordinate increment/decrement signal and the Y-coordinate increment/decrement signal, the adder/subtracter 20 will increment or decrement the contents of the XD' register 38 and the YD' register 40. As a result, the XD' register 38 and the YD' register 40 are respectively re-written with an X-coordinate and a Y-coordinate of a starting dot A2 of a second lengthwise straight line (composed of dots A2, B2, C2, D2, E2 and F2) of a unitary dot width which should be drawn after a first lengthwise straight line (composed of dots A1, B1, C1, D1, E1 and F1). At this time, whether or not the values of both the XD' register 38 and the YD' register 40 are changed is determined, and if the values of both the XD' register 38 and the YD' register 40 are changed, the dot controller 22 is notified of the foot. (For example, the dot controller 22 can know this fact by examining the X-coordinate increment/decrement signal and the Y-coordinate increment/decrement signal from the widthwise straight line generator 18.)

STEP 4

The memory access controller 28 causes the dot information stored in the dot information register 30 to be outputted to the display memory 32, and controls the memory so that the dot information is written into a memory location corresponding to a dot position A1 in FIG. 7, i.e., the coordinate (XD, YD) defined by the contents of the XD register 24 and the YD register 26.

STEP 5

Thereafter, the lengthwise straight line generator 16 is controlled to generate, on the basis of the contents of the $\Delta X$ and $\Delta Y$ registers 12 and 14, an X-coordinate increment/decrement signal and a Y-coordinate increment/decrement signal which respectively indicate the displacement both in the X-direction and in the Y-direction from the drawing starting dot A1 (XD, YD) of a second dot B1 of the same lengthwise straight line extending from the drawing starting dot A1. On the basis of the X-coordinate increment/decrement signal and the Y-coordinate increment/decrement signal, the adder/subtracter 20 will increment or decrement the contents of the XD register 24 and the YD register 26. As a result, the XD register 24 and the YD register 26 are respectively re-written with an X-coordinate and a Y-coordinate of the second lengthwise dot B1 of the first lengthwise straight line (composed of dots A1, B1, C1, D1, E1 and F1) which should be drawn after the drawing starting point A1.

At this time, whether or not the values of both XD register 24 and the YD register 26 are changed is discriminated, and if the values of both XD register 24 and the YD register 26 are changed, the dot controller 22 is notified of the fact. (For example, the dot controller 22 can know this fact by examining the X-coordinate increment/decrement signal and the Y-coordinate increment/decrement signal from the lengthwise straight line generator 16.)

When the values of both the XD' register 38 and the YD' register 40 have been changed and the values of both the XD register 24 and the YD register 26 are changed, the direction of the widthwise vector in relation to the direction of the lengthwise vector can be known. In the example shown in FIG. 7, the dot controller 22 judges that the widthwise vector is directed to the right of the lengthwise vector.

In addition, under the condition in which the values of both the XD' register 38 and the YD' register 40 have been changed, if the values of both the XD register 24 and the YD register 26 are changed, the dot controller 22 operates to decrement the content of the YD register 26 since it is judged that the widthwise vector is directed to the right of the lengthwise vector. Thereafter, the memory access controller 28 causes the dot information stored in the dot information register 30 to be outputted to the display memory 32, and controls the memory so that the dot information is written to a memory location corresponding to a dot position x1 in FIG. 7, i.e., the coordinate (XD, YD-1) defined by the content of the XD register 24 and the decremented content of the YD register 26. Thereafter, the dot controller 22 operates to restore the content of the YD register 26 to (YD).

STEP 6

Next, whether it is DH=0 or not is determined by the data processor 10. If DH>0, the DH register 34 is decremented by the data processor 34, and the operation is returned to the STEP 4. As a result, the operation of STEP 4 to STEP 6 is repeated until it becomes DH=0, so that the dot information stored in the dot information register 30 is sequentially written into memory locations corresponding to the dots B1, C1, x2, D1, E1, x3 and F3.

STEP 7

If it becomes DH=0, whether DV=0 or not is determined by the data processor 10. If DV>0 the DV register 36 is decremented by the data processor 10, and the XD register 24, the YD register 26 and the HD register 34 are re-written with the contents preserved in the XD' register 38, the YD' register 40 and the HD' register 42. Thereafter, the operation is returned to STEP 3. Accordingly, a second lengthwise straight line composed of dots A2, B2, C2, D2, E2 and F2, a third lengthwise straight line composed of dots A3, y1, B3, C3, y2, D3, E3, y3 and F3, and all succeeding required lengthwise straight lines are drawn until it becomes DV=0.

STEP 8

If it becomes DV=0, the operation is terminated.

As seen from the above, the dots x1, x2, x3, y1, y2, y3, z1, z2 and z3 which would become the "wormholes" in the conventional system have been filled up by the dot information stored in the dot information register. Accordingly, the inclined rectangular pattern having no "wormhole" has been drawn. Namely, an inclined rectangular pattern impression a natural providing is obtained.

In the above mentioned embodiment, the elongated rectangle having the length of 6 dots and the width of 5 dots has been drawn. However, the above embodiment can draw not only the above mentioned elongated rectangles, but also other various rectangle including a square and a wide solid line composed of a plurality of lengthwise straight lines having a unitary dot width.

The invention has thus been shown and described with reference to the specific embodiments. However, it should be noted that the present invention is in no way limited to the details of the illustrated structures but changes and modifications may be made within the scope of the appended claims.

I claim:

1. A rectangular pattern generating system for generating an inclined rectangular pattern on a two-dimensional X-Y plane by re-writing a display memory, comprising:

a read-write memory comprising a plurality of unitary memory elements corresponding in a one-to-one relation to coordinate points on said two-dimensional X-Y plane;

means for storing inclined angle information of said inclined rectangular pattern to be generated;

lengthwise straight line generating means, coupled to said inclined angle information storing means, for generating X- and Y- direction increment/decrement signals indicative of a coordinate change component between a first dot being currently written into said memory and a second dot to be next written into said memory, said first and second dots being adjacent to each other and being included in a string of dots forming a lengthwise straight line in parallel to a lengthwise side of said inclined rectangular pattern to be generated;

widthwise straight line generating means coupled to said inclined angle information storing means for generating X- and Y- direction increment/decrement signals indicative of a coordinate change component between a starting dot of a lengthwise straight line being currently written into said memory and a starting dot of another lengthwise straight line to be next written into said memory;

means, coupled to said lengthwise straight line generating means and said widthwise straight line generating means, for generating an address and coupled to said memory for supplying said address to said memory;

means, coupled to said memory, for writing dot information into a unitary memory element of said memory designated by said address generating means; and a dot controller, coupled to said lengthwise straight line generating means and said widthwise straight line generating means, and operating in such a manner that when said lengthwise straight line generating means indicates a coordinate change both in X- and Y- directions and when said widthwise straight line generating means indicates a coordinate change both in X- and Y- directions, said dot controller causes said dot information writing means to write dot information into a unitary memory element of said memory corresponding to a coordinate which changes only either in a X-direction or in a Y-direction from a coordinate into which immediately preceding dot information has been written.

2. A system claimed in claim 1 wherein said inclined angle information storing means includes a $\Delta X$ register for storing a X-direction minute change component $\Delta X$ and a $\Delta Y$ register for storing a Y-direction minute change component $\Delta Y$ where $\Delta X/\Delta Y = \tan \theta$ and $\theta$ indicates an inclined angle of said inclined angle information.

3. A system claimed in claim 1 wherein said address generating means includes a XD register initialized to store an X-coordinate of a pattern drawing starting point and a YD register initialized to store a Y-coordinate of said pattern drawing starting point, and an adder/subtracter for receiving said X- and Y- direction increment/decrement signals from said lengthwise straight line generating means and for updating said XD and YD registers.

4. A system claimed in claim 3 wherein said XD and YD registers are associated with XD and YD preserving registers, respectively, for preserving contents of said XD and YD registers until one lengthwise straight line is written into said memory.

5. A system claimed claim 4 further including a length register for storing a length of said rectangular pattern to be generated, said length register being decremented each time one dot information is written into said memory, and a width register for storing a width of said rectangular pattern to be generated, said width register being decremented each time one lengthwise straight line of dot information is written into said memory.

* * * * *